Patented July 7, 1953

2,644,760

UNITED STATES PATENT OFFICE 2,644,760

PRINTING INK

Arthur J. Schroeder, Cincinnati, Ohio, assignor to Sterling Drug Inc., New York, N. Y., a corporation of Delaware No Drawing. Application July 9, 1951,
Serial No. 235,910

16 Claims. (Cl. 106—28)

This invention relates to new and improved printing inks, printing ink pigment pastes, and printing ink varnishes.

One of the chief problems arising in the manufacture, storage, shipping, and use of printing inks, printing ink varnishes, and particularly printing ink pigment pastes is the tendency of these compositions to become thixotropic and to increase in body on standing. In many cases, the composition eventually exhibits the phenomenon known as "livering," that is, the composition coagulates as a result of the gelatinization of the vehicle, so that it becomes non-workable. Heretofore, attempts to avoid these undesirable characteristics have involved the use of vehicles of low acid number and low viscosity, avoidance of certain pigments known to be likely to cause livering, and addition of certain surface-active agents to the ink or ink vehicle. However, these precautions have proved largely to be unsatisfactory, being restrictive as to choice of ink ingredients, and introducing such further difficulties as undesirable reduction in color strength of the composition, or, especially when surface-active agents proposed in the prior art are used, interference with the removal of water from the pigment paste and excessive bleeding.

It is an object of this invention to overcome the foregoing objections and to provide printing inks, printing ink pigment pastes, and printing ink varnishes which have high stability of viscosity and improved flow characteristics, and which are substantially non-bleeding. I have now discovered that compositions having these desired properties are obtained by adding to the ink, pigment paste or varnish a relatively small amount of a wetting agent obtained by condensing a polyethylenepolyamine with propylene oxide.

While there are no sharply defined limits to the proportion of the wetting agent to be employed, I have found that for practical purposes the amount of polyethylenepolyamine-propylene oxide condensation product should be at least about 0.5%, and preferably about 1–2%, by weight of the varnish component of the ink, pigment paste, or varnish. The percentage of wetting agent can be as high as 7.8% or more, but for reasons of economy I prefer not to use such larger amounts of the wetting agent, since no particular advantage is thereby attained.

The printing ink pigment pastes and printing inks provided by my invention exhibit improved wetting of the pigment by the vehicle, better flow, decrease in thixotropic properties, reduced tendency to increase in body on aging, and substantially less bleeding of pigment and vehicle when compared on the one hand with ink compositions otherwise similarly prepared but with no wetting agent present, and on the other hand with analogous compositions containing other types of wetting agents, for example unmodified polyethylenepolyamines.

In accordance with my invention, the polyethylenepolyamine-propylene oxide condensation product is added at any stage during the formulation of the printing ink or ink vehicle. Thus, the wetting agent can be added to a printing ink varnish to produce an improved varnish, which can then be employed as a printing ink vehicle in a conventional flushing or grinding procedure to produce pigment pastes or printing inks embodying the aforesaid advantages of my invention. The incorporation of the wetting agent into a printing ink varnish can be carried out by merely mixing the two materials at room temperature. In general, however, I have found that it is advantageous to heat the wetting agent and the varnish while they are being mixed, for example, at 50–90° C. for 30–60 minutes. Alternatively, the wetting agent can be added during the flushing or grinding of pigment into an ink vehicle to produce an improved pigment paste or a printing ink, as desired.

The wetting agent which I employ in practicing my invention is readily obtained by condensing a polyethylenepolyamine with propylene oxide. This condensation is conveniently carried out by heating the polyethylene-polyamine with propylene oxide at about 50–130° C. The proportion of propylene oxide to polyethylenepolyamine employed in this condensation reaction can be varied over a considerable range while still affording a product useful in carrying out my invention. For practical purposes, I generally prefer to employ a molar ratio of the polyethylenepolyamine to propylene oxide in the approximate range 2:1 to 1:5.

The polyethylenepolyamines suitable for use in preparing the wetting agents employed in my invention are polyamines of the ethylenediamine series and include, for example, tetraethylenepentamine, triethylenetetramine, diethylenetriamine, pentaethylenehexamine, and the like. The polyamines containing 3–6 nitrogen atoms have been found to be the most suitable ones.

In particular, I prefer to employ a wetting agent obtained by the interaction of tetraethylenepentamine with propylene oxide. In preparing the tetraethylenepentamine-propylene oxide wetting agent, I have found that it is preferable to employ about 0.2–1.0 mole of tetraethylenepentamine per mole of propylene oxide in the condensation reaction. I have compared pigment pastes and inks prepared in accordance with my invention and containing the condensation product obtained by interacting tetraethylenepentamine with propylene oxide in various molar ratios, for example in the amine:oxide ratios 2:1, 1:1, 1:3.2, and 1:5. In this manner, I have determined that it is particularly advantageous to employ the tetraethylenepentamine-propylene oxide condensation product obtained by interacting about 0.3 mole of tetraethylenepentamine per mole of propylene oxide.

My invention is adapted to use with a wide variety of ink compositions which contain conventional inorganic and organic pigments, both of the dry color and flushed color type, either resinated or non-resinated, in an ink vehicle. The varnishes in these inks can be either bodied oils, or solutions or dispersions of natural or synthetic resins in a suitable solvent. These resins are well-known in the printing ink art and include, for example, rosin, esterified rosins such as rosin-glycerol ester, maleic adduct of rosin, copal, shellac, alkyd resins such as a glycerol-phthalic anhydride-fatty acid resin, coumarone-indene resins, oil-modified phenolformaldehyde resins, esterified tall oil, etc. I have found that my invention offers particular advantage when azo pigments are employed in the preparation of the pigment paste or ink.

My invention is especially adapted to use with ink compositions, including lithographic inks, which contain as the varnish component a bodied vegetable drying oil such as linseed oil, Chinawood or tung oil, perilla oil, soya bean oil, and the like, and with ink compositions containing as the varnish component a natural or synthetic resin dissolved or dispersed in a liquid hydrocarbon solvent, for example a mineral oil or petroleum fraction.

My invention is illustrated by the following examples without, however, being restricted thereto.

EXAMPLE 1

A. *Wetting agent*

25.5 pounds of tetraethylenepentamine was placed in a 12-gallon stainless steel kettle fitted with a reflux condenser, an agitator, and a two-liter glass separatory funnel. The tetraethylenepentamine was stirred while heating the kettle until the temperature of the tetraethylenepentamine had reached about 70° C. Propylene oxide was then added to the tetraethylenepentamine through the separatory funnel at such a rate as to cause only a very slight refluxing of the propylene oxide. A total of 25 pounds of propylene oxide was added in this manner over a period of about ten hours. There was thus obtained as the product of this reaction about 50.5 pounds of a viscous pale brown liquid.

B. *Printing ink varnish*

400 pounds of No. 1 Regular Varnish (aged linseed oil which had been heat-polymerized to a viscosity of approximately 22 poises at 25° C., having an acid number 11–17 and a color value of 15–17 on the Gardner 1933 Color Scale) was placed in a mixing machine with four pounds of the tetraethylenepentamine-propylene oxide condensation product obtained as described above in Part A and mixed for about 30 minutes at 75° C. The varnish thus obtained was allowed to cool and was subsequently employed as a flushing vehicle as described below in Part C.

C. *Pigment paste*

To the approximately 404 pounds of varnish obtained as described above in Part B, there was added a quantity of moist (water-wet) press cake of Resinated Barium Lithol (resinated with wood rosin) containing about 500 pounds of the pigment on a dry basis. After thorough mixing of these ingredients, 30 pounds of barium chloride was added thereto as a flushing aid, and after again thoroughly mixing the material, the water layer which separated from the pigment paste was removed. Portions of this pigment paste were reduced in viscosity, as desired, by addition of suitable quantities of low-viscosity varnishes such as No. 0 Regular Varnish (aged linseed oil which had been heat-polymerized to a viscosity of approximately 11.4 poises at 25° C., having an acid number 12–16 and a color value of 15–17 on the Gardner 1933 Color Scale) and No. 000 Regular Varnish (aged linseed oil which had been heat-polymerized to a viscosity of approximately 2.3 poises at 25° C., having an acid number 6–11 and a color value of 15–17 on the Gardner 1933 Color Scale). The pigment pastes thus obtained were then vacuum dried at 50–55° C. until the moisture content was reduced to 1–2%. The ease with which the water content of these pastes was removed and the flow of the finished paste indicated excellent pigment wetting by the varnish.

EXAMPLE 2

A. *Printing ink varnish*

450 pounds of No. 1 Pale Varnish (alkali-refined linseed oil which had been heat-polymerized to a viscosity of approximately 22 poises at 25° C., having an acid number 6–10 and a color value of 6–11 on the Gardner 1933 Color Scale) was placed in a mixing machine with 4.5 pounds of the tetraethylenepentamine-propylene oxide condensation product obtained as described above in Example 1A. These materials were mixed for about 30 minutes at 75° C. The varnish thus obtained was then allowed to cool and was employed as a flushing vehicle in the manner set forth below.

B. *Printing ink pigment paste*

To the varnish obtained as described above in Part A, there was added a quantity of moist (water-wet) press cake of Resinated Red Lake C (resinated with wood rosin) containing about 500 pounds of the pigment on a dry basis. The pigment and the varnish were thoroughly mixed, 30 pounds of barium chloride was then added as a flushing aid and mixed in thoroughly, and the water which separated from the pigment paste was removed. Portions of this flushed pigment paste were cut back to various desired viscosities with low-viscosity varnishes, and the respective pigment pastes were then vacuum dried at 50–55° C. to a moisture content of 1–2%. It was found that the water content of these pigment pastes was quickly adjusted to the desired low value. Excellent pigment wetting was indicated by this drying behavior, as was also shown by the flow of the finished pigment paste.

C. *Printing inks*

The Resinated Red Lake C pigment paste obtained above in Part B, the Resinated Barium Lithol pigment paste obtained as described above in Example 1C, and a Non-Resinated Barium Lithol pigment paste obtained in a manner analogous to that described in Example 1C for the resinated pigment, all of which pastes contained a tetraethylenepentamine-propylene oxide condensation product, were each incorporated into a printing ink vehicle to form a printing ink containing the following ingredients, these ingredients being compounded in conventional fashion:

| | Parts by weight |
|---|---|
| Pigment paste | 6.00 |
| No. 1 Regular Varnish | 3.50 |
| Calcium Carbonate White Extender | 5.00 |
| Modifier | 0.50 |
| Drier | 0.25 |
| Total | 15.25 |

The modifier in the formula above consisted of a mixture of ceresine wax, beeswax, and cornstarch, and the drier was a balanced cobalt-manganese-lead drier containing 0.5% cobalt, 10.0% lead and 2.0% manganese in aged linseed oil. The three inks obtained in this manner were compared with similar inks lacking only the tetraethylenepentamine-propylene oxide wetting agent and it was found that the former inks, prepared in accordance with my invention, had better body and viscosity stability, better press flow, and substantially less tendency to bleed than the latter inks.

EXAMPLE 3

50 parts by weight of a maleic acid adduct of rosin (a resin having a softening point of 143° C., specific gravity 1.14, and an acid value of 37) was dissolved in 50 parts by weight of an aromatic petroleum fraction boiling at 172–190° C. To the hot solution there was then added one part by weight of the tetraethylenepentamine-propylene oxide condensation product obtained as described above in Example 1A, the temperature being held at 90° C. for about 30 minutes.

When the varnish obtained in this manner is used as a flushing varnish to flush a moist pigment pulp, or alternatively, when the varnish is ground with a dry pigment, there is obtained in each instance a printing ink pigment paste which has improved body and flow and reduced tendency to increase in body on aging when compared with a pigment paste of otherwise similar composition but lacking the tetraethylenepentamine-propylene oxide condensation product.

EXAMPLE 4

34 parts by weight of tall oil (analysis: fatty acids, 43.3%; rosin acids, 51.0%; unsaponifiable material, 5.7%) having an acid value of 165 was heated with six parts by weight of pentaerythritol at about 118° C. until the acid value of the mixture was reduced to 20–25. To this mixture there was added 40 parts by weight of mineral oil having a viscosity of 1200 poises at 100° C. There was then added 0.8 part by weight of tetraethylenepentamine - propylene oxide condensation product obtained as described above in Example 1A and the mixture was heated to 75° C. and held at this temperature for about 30 minutes.

By employing this varnish as a flushing varnish to flush a moist pigment pulp, there is obtained a printing ink pigment paste having good flow, excellent vacuum drying characteristics, and little or no tendency to increase in body even on accelerated aging at 70° C.

EXAMPLE 5

Printing ink pigment paste 15.00 parts of No. 1 Regular Varnish, 12.00 parts of dry Red Lake C, and 0.27 part of tetraethylenepentamine-propylene oxide condensation product obtained as described above in Example 1A (all parts being by weight) were ground together in a roller mill in conventional fashion to produce a pigment paste. Another pigment paste was then prepared in similar manner but omitting the tetraethylenepentamine-propylene oxide condensation product. These two pigment pastes were compared and it was found that the pigment paste containing the tetraethylenepentamine-propylene oxide condensation product had much better body, flow, and viscosity stability characteristics, and showed substantially less tendency to exhibit color bleeding.

EXAMPLE 6

Proceeding in the manner set forth above in Example 1A, approximately three moles of propylene oxide and one mole of triethylenetetramine were heated together at 90–110° C. to produce a triethylenetetramine-propylene oxide condensation product which consisted of a viscous pale brown liquid. Approximately two parts by weight of this product was mixed with 100 parts by weight of No. 1 Regular Varnish to produce a flushing varnish which was then employed to flush Resinated Barium Lithol pulp. There was thus obtained a pigment paste which exhibited better body, flow, and viscosity stability characteristics than a pigment paste otherwise similarly prepared but lacking the triethylenetetramine-propylene oxide condensation product.

Proceeding in the manner of the above examples, printing ink pigment pastes and printing inks can be obtained which contain a polyethylenepolyamine - propylene oxide condensation product and wherein the pigment is Toluidine Red, Calcium Lithol, Strontium Lithol, Sodium Lithol, Red Lake D, Methyl Violet Phosphotungstic-Phosphomolybdic Lakes, Peacock Blue Lake, Chrome Yellow, Iron Blue, etc. The pigment pastes and printing inks so obtained exhibit improved pigment wetting, body, flow and viscosity stability when compared with similar compositions not containing the polyethylenepolyamine-propylene oxide condensation product.

I claim:

1. A pigment paste suitable for incorporation into a printing ink which comprises a pigment, a printing ink varnish, and a small amount of a wetting agent obtained by heating a polyethylenepolyamine containing 3–6 nitrogen atoms with propylene oxide in the ratio of approximately 0.2–1.0 mole of polyethylenepolyamine per mole of propylene oxide.

2. A pigment paste suitable for incorporation into a printing ink which comprises a pigment, a printing ink varnish, and a small amount of a wetting agent obtained by heating tetraethylenepentamine with propylene oxide in the ratio of approximately 0.2–1.0 mole of tetraethylenepentamine per mole of propylene oxide.

3. A pigment paste suitable for incorporation into a printing ink which comprises a pigment, a bodied vegetable drying oil, and a small amount of a wetting agent obtained by heating tetraethylenepentamine with propylene oxide in the ratio of approximately 0.2–1.0 mole of tetraethylenepentamine per mole of propylene oxide.

4. A pigment paste suitable for incorporation into a printing ink which comprises a pigment, a printing ink varnish comprising a resin and a liquid organic solvent, and a small amount of a wetting agent obtained by heating tetraethylenepentamine with propylene oxide in the ratio of approximately 0.2–1.0 mole of tetraethylenepentamine per mole of propylene oxide.

5. A pigment paste suitable for incorporation into a printing ink which comprises a pigment, a bodied linseed oil, and a small amount of a wetting agent obtained by heating tetraethylenepentamine with propylene oxide in the ratio of approximately 0.2–1.0 mole of tetraethylenepentamine per mole of propylene oxide.

6. A pigment paste suitable for incorporation into a printing ink which comprises a pigment, a bodied linseed oil, and a small amount of a wetting agent obtained by heating tetraethylenepentamine with propylene oxide in the ratio of approximately 0.3 mole of tetraethylenepentamine per mole of propylene oxide.

7. A printing ink comprising a pigment, a solvent component, a printing ink varnish, and a small amount of a wetting agent obtained by heating a polyethylenepolyamine containing 3–6 nitrogen atoms with propylene oxide in the ratio of approximately 0.2–1.0 mole of polyethylenepolyamine per mole of propylene oxide.

8. A printing ink comprising a pigment, a solvent component, a printing ink varnish, and a small amount of a wetting agent obtained by heating tetraethylenepentamine with propylene oxide in the ratio of approximately 0.2–1.0 mole of tetraethylenepentamine per mole of propylene oxide.

9. A printing ink comprising a pigment and a printing ink vehicle comprising a bodied vegetable drying oil and a small amount of a wetting agent obtained by heating tetraethylenepentamine with propylene oxide in the ratio of approximately 0.2–1.0 mole of tetraethylenepentamine per mole of propylene oxide.

10. A printing ink comprising a pigment and a printing ink vehicle comprising a bodied linseed oil and a small amount of a wetting agent obtained by heating tetraethylenepentamine with propylene oxide in the ratio of approximately 0.2–1.0 mole of tetraethylenepentamine per mole of propylene oxide.

11. A printing ink comprising a pigment and a printing ink vehicle comprising a bodied linseed oil and a small amount of a wetting agent obtained by heating tetraethylenepentamine with propylene oxide in the ratio of approximately 0.3 mole of tetraethylenepentamine per mole of propylene oxide.

12. A printing ink vehicle comprising a printing ink varnish and a small amount of a wetting agent obtained by heating a polyethylenepolyamine containing 3–6 nitrogen atoms with propylene oxide in the ratio of approximately 0.2–1.0 mole of polyethylenepolyamine per mole of propylene oxide.

13. A printing ink vehicle comprising a printing ink varnish and a small amount of a wetting agent obtained by heating tetraethylenepentamine with propylene oxide in the ratio of approximately 0.2–1.0 mole of tetraethylenepentamine per mole of propylene oxide.

14. A printing ink vehicle comprising a bodied vegetable drying oil and a small amount of a wetting agent obtained by heating tetraethylenepentamine with propylene oxide in the ratio of approximately 0.2–1.0 mole of tetraethylenepentamine per mole of propylene oxide.

15. A printing ink vehicle comprising a bodied linseed oil and a small amount of a wetting agent obtained by heating tetraethylenepentamine with propylene oxide in the ratio of approximately 0.2–1.0 mole of tetraethylenepentamine per mole of propylene oxide.

16. A printing ink vehicle comprising a bodied linseed oil and a small amount of a wetting agent obtained by heating tetraethylenepentamine with propylene oxide in the ratio of approximately 0.3 mole of tetraethylenepentamine per mole of propylene oxide.

ARTHUR J. SCHROEDER.

References Cited in the file of this patent

UNITED STATES PATENTS

| Number | Name | Date |
|---|---|---|
| 2,267,205 | Kyrides | Dec. 23, 1941 |
| 2,272,489 | Ulrich | Feb. 10, 1942 |
| 2,285,183 | Bernardi | June 7, 1942 |
| 2,450,534 | Voet | Oct. 5, 1948 |
| 2,469,683 | Dudley et al. | May 10, 1949 |

OTHER REFERENCES

Gregory Uses and Applications of Chemicals and Related Materials, vol. II, 1944, page 186.

Zettlemoyer, "Ind. & Eng. Chem." 41 pages 1501–4 (1950).

Carr, "Official Digest of the Paint & Varnish Production Clubs," Aug. 1951, presented to the Birmingham Club April 5, 1951, pages 510–516.